Figure 1:
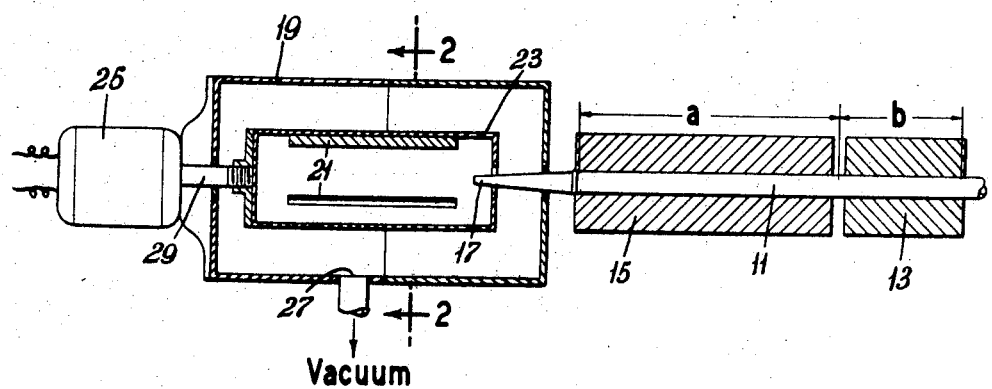

Jan. 19, 1971 W. F. GORHAM ET AL 3,556,881

ENCAPSULATED CHEMICAL PRODUCT

Filed March 1, 1962

INVENTORS
WILLIAM F. GORHAM
WILLIAM E. LOEB

BY Walter C. Kehm

ATTORNEY

United States Patent Office 3,556,881
Patented Jan. 19, 1971

3,556,881
ENCAPSULATED CHEMICAL PRODUCT
William F. Gorham, Berkeley Heights, and William E. Loeb, Martinsville, N.J., assignors to Union Carbide Corporation, a corporation of New York
Filed Mar. 1, 1962, Ser. No. 176,630
Int. Cl. C06b 19/02; C06d 5/00
U.S. Cl. 149—7
16 Claims The present invention is directed ot the encapsulation of nitronium perchlorate, a potent solid oxidizer useful in solid fuel formulations for missile and rocket propellants. More particularly the present invention is directed to a coating for solid particulate nitronium perchlorate which will prevent instantaneous hydration of the nitronium perchlorate.

Potent solid oxidizers for missiles and rocket propellent formulations necessarily should have a high weight percent of available oxygen for maximum utilization of fuel energy. One such material having high oxygen content and showing possibility for use in solid formulations is nitronium perchlorate, $NO_2ClO_4$. This compound contains 67% combined oxygen, and by volume has more available oxygen than does liquid oxygen. Thus, it has great potential as an energetic oxidant in solid fuel formulations for missiles and rockets. Unfortunately, this material is also a highly reactive chemical, so reactive in fact that it is very difficult and dangerous to contain. It reacts with explosive force in contact with most organic compounds such as alcohol, amines, ethers, phenols and aromatic hydrocarbons. It is also remarkably hygroscopic and is instantaneously hydrated on even brief exposure to atmospheric humidity to form a dangerous mixture of nitric and perchloric acids.

The need is therefore obvious to find a manner or means of preventing the contact of this material with atmospheric humidity and to organic compounds. Inasmuch as the most superior binders and solid fuel systems known today are organic in nature or are formulated in organic systems, the use of this potent oxidizer in rocket fuel formulations is necessarily dependent upon providing a stable, inert, moisture-impervious coating for the solid material. There was heretofore, no known solution to utilizing existing polymers and conventional coating technique because of the unusual sensitivity of nitronium perchlorate to water, solvents, organic polymers, and the like.

It has heretofore been proposed to coat inert materials with coatings of poly(p-xylylenes) by contacting the surface of metallic gauges, copper wire and like material with the partial pyrolysis product of p-xylene. In general, p-xylene heated to about 900° C. undergoes molecular breakdown to form p-xylylene diradicals and a mixture of numerous other molecular fragments which upon cooling condenses to form a mass comprising polymer chains having a wide range of molecular weights and a mixture of other materials including some p-xylene 1,3 di-p-tolylethane and higher molecular weight by-products. A considerable portion of the polymeric mass consists of substantially insoluble cross-linked poly(p-xylene) but almost 10 to 20 weight percent of the condensed mass comprises relatively low molecular weight material which is soluble in such common solvents as benzene, acetone, carbon tetrachloride, and chloroform.

In coating applications the extractable content of the protective coating could prove to be a highly deleterious contaminant. Also, such extraction frequently destroys the continuity of the coating and renders it permeable to substrate attacking fluids, and vaporous materials.

This process also suffers with the disadvantage that only about 10–15% of the p-xylene is pyrolyzed, with the remaining 85–90% of the p-xylene passing through the system unchanged. Attempts to coat xylene-sensitive, and the highly reactive nitronium perchlorate thus cannot be successfully accomplished by this technique as it would undoubtedly lead to instantaneous explosion.

It is an object of the present invention to provide means for coating the surface of nitronium perchlorate to make it potentially unreactive and resistant to chemical attack. It is a further object of the present invention to provide a coated particulate nitronium perchlorate, which coating is uniformly insoluble in common organic solvents, is resistant to oxidation by the nitronium perchlorate, impermeable to moisture and yet provides a tough exterior coating sufficiently resistant to mechanical rupture for normal handling without the consequential danger recited above.

According to the present invention, it has now been discovered that strong inert, moisture-impervious coatings can be applied to nitronium perchlorate pellets or granules, which coatings are highly resistant to solvents, and protect the nitronium perchlorate from all of the organic materials and from atmospheric humidity. In addition, the coatings as described hereinafter appear to be completely inert to the nitronium perchlorate and thus provide strong, tough polymeric coatings to the pellets. With this invention, it is now possible to employ nitronium perchlorate with conventional organic fuels and binders and safely mix, ship and handle the solid material without danger of explosion or unwanted reactions.

The coatings now discovered to provide these highly desirable results can be considered as an inner coating and an outer coating, at least the inner coating of which is based on an organic polymer of p-xylene. It is highly critical in this invention that the respective coatings be selected with care, and that they be applied to the pellet or granule with equal care.

The inner coating on the surface of the pellets or granules in direct contact with the nitronium perchlorate, it has been found, must be of a polymer having the repeating unit

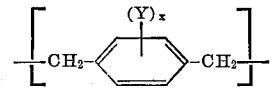

I wherein Y is an electron withdrawing substituent group on the p-xylylene unit having a positive sigma para value of at least 0.20, $x$ is an integer from 1 to 3, inclusive, and the sum of the sigma para value of the substituent groups is at least 0.40.

It has been found that such a polymeric coating in contact with the nitronium perchlorate is basically inert to this highly oxidative and nitrating material and thus will deactivate the surface permitting a measure of control over the reactivity of the nitronium perchlorate. The reduced degree of interaction of the nitronium perchlorate to these substituted poly(p-xylylenes) is apparently due to both electronic and steric effects with the former having the greatest measure of control. Thus, strong electron withdrawing groups having a high sigma para value are necessary.

As employed herein the term "positive sigma para value" means the relative electron withdrawing power of substituent groups conventionally known as the Hammett Sigma Para Value as is set forth by Jaffe, in Chemical Reviews, 53, page 222 (1953). In this article, the principal aromatic substituent groups are classified as to their electron withdrawing power. Those substituents possessing a negative sigma para value will increase the average electron density on an aromatic nucleus and thus activate the nucleus toward reaction, whereas the groups possessing a positive sigma para value will decrease the average electron density and thus relatively inactivate the nucleus. It is believed that the substituted poly-p-xylylene by this substituent group is made so inactive to the nitronium perchlorate that it can coat the pellets or granules and thus be so inert and stable to the oxidizer that no untoward reaction or explosion can occur.

Those substituent groups which can be employed and which have positive sigma para values above 0.20 include for example those of the following list, in which the relative sigma para values are shown

| Group: | Sigma para value |
|---|---|
| —Cl | +0.227 |
| —Br | +0.232 |
| —I | +0.276 |
| —C(=O)—OH | +0.265 |
| —C(=O)—H | +0.216 |
| —C(=O)—O—R (where R is any alkyl group) | +0.522 |
| —CF$_3$ | +0.551 |
| —C≡N | +0.628 |
| —SO$_2$CH$_3$ | +0.728 |
| —NO$_2$ | +0.778 |

The above listing is exemplary only, for any similar electron withdrawing group having a sigma para value above 0.2 can be employed.

It is likewise critical herein that the sum of the sigma para values of the substituent groups on the aromatic nucleus of the p-xylene unit of the polymer be at least 0.40. Attempts at coating the nitronium perchlorate pellets and granules with single aromatic substituent polymers where the substituent groups have an electron withdrawing power of only about +0.2 or 0.3 were uniformly unsuccessful due to extensive oxidation of the polymer by the nitronium perchlorate. This ultimately leads to degradation of the polymer and thus ineffective encapsulation.

However, the electron withdrawing power of the substituent groups appears to be additive so that two or more groups each having a sigma para value less than about +0.35 on the aromatic nuclei of the repeating p-xylylene units must be present although only one substituent group need be present when the group has a sigma para value of at least about +0.4 or greater. It is indicated that the greater the sum of the sigma para values of the substituent groups on the aromatic nucleus, the safer the polymer is in direct contact with the nitronium perchlorate.

These polymers having these electron withdrawing groups are prepared from the cyclic di-p-xylylenes which is readily substitutable on the aromatic ring with the electron withdrawing group, but cannot be prepared from substituted p-xylene itself. The substitution of such cyclic di-p-xylylene can be conducted by appropriate treatment for the introduction of substituent groups, preferably conducted at low temperatures due to the possibility of cleavage or rearrangement of the di-p-xylylene at high temperatures. Free radical, base and weak acid catalysts thus are able to halogenate, cyanolate, nitrate, acetylate and/or esterify the di-p-xylylene to make it possible to prepare these substituted polymers.

The poly(dichloro-p-ylylene), poly(trichloro-p-xylylene), and poly(monocyano-p-xylylene) are most preferred. However, the corresponding bromine substituted polymers are also quite satisfactory and give good results.

It is quite possible also that when two substituent groups are present on the aromatic nuclei, they can be different groups as well as the same. For example, polymers having mixed substituents on the aromatic nuclei such as a bromine and a chlorine on the same aromatic ring, or a chlorine and a cyano on the same ring, or other suitable poly-substituted material wherein the sum of the sigma para values of the substituted groups total at least about 0.40.

Similarly, copolymers of different Y groups in the polymeric units can be employed as long as the individual Y groups have a sum of the sigma para values of at least about 0.40. These are likewise included within this invention and covered by the structural repeating unit of the polymer heretofore shown.

It is of course obvious that the coating of the substituted poly(p-xylene) must be continuous over the entire surface of the pellet or granule, although it can be quite thin, i.e. in the order of about 0.1 mil but preferably somewhat thicker. Since the polymer coating is itself an organic hydrocarbon and is combustible for rocket propellant purposes, the thickness is not narrowly critical but excessive coatings are not economically desirable. Also, excessive coatings of such polymers are desirably avoided because other polymer binders possess greater fuel and thrust power in rocket formulations and volume occupied by excessive coatings could better be utilized by higher thrust fuels. Preferably, the best coatings for complete and safe encapsulation are secured when the coating weight comprises from 3 to 12 percent by weight of the uncoated pellets, however, substantial passivation and inactivation of the surface of the nitronium perchlorate has been secured with as low as 1 percent by weight, and for certain applications it may be desirable to apply even less, if pin holes or weak coatings do not create undue hardships in handling or in rocket propellant formulations.

In composite rocket fuel formulations composed of oxidizer and fuel, the oxidizer component is present generally in amounts between about 40 and 95 percent by weight in order to provide maximum theoretical thrust and utilization of fuel power. While the poly(p-xylylene)'s have a reasonably high fuel value, the use of extremely heavy coatings on the nitronium perchlorate may be somewhat undesirable since it necessarily takes part of the 5 to 60 percent of the weight of the fuel formulation allocated to the fuel per se, and higher energy fuels may be desired. Thus, it is desirable in this invention that the inner coating be as thin as possible, and preferably not be more than about 10% by weight of the pellets, but yet be sufficiently strong and moisture resistant to prevent severe mechanical fracture of the pellets in normal handling. Basically, however, there is no maximum in the coating thickness.

The physical properties of these substituted p-xylylene coatings makes certain of them quite useful as both the inner and outer coatings even in thin coatings. Certain others, however, in thin coatings are slightly deficient in toughness, i.e. tensile stiffness modulus, or in solvent and moisture resistance and moisture transmission rate. It is obvious that if thick enough coatings are employed that both of such problems are eventually solved, but at a sacrifice to optimum fuel potential.

Thus it is one aspect of this invention to overcoat the inner coating with a tougher and more solvent and moisture resistant p-xylylene resin which, with a very thin coating, can supply any deficiencies in mechanical properties possessed by the inner coating. While the outer coating is not as critical as is the inner coating it should be selected to possess a high resistance to moisture and solvent resistance and high tensile stiffness in thin coatings. For this use, it has been found that poly(p-xylylene), poly(chloro-p-xylylene) and poly(bromo-p-xylylene) to be outstanding members of the group. However, the poly (dichloro-p-xylylene), poly(ethyl-p-xylylene) are also quite satisfactory. Preferably for this use, polymers having a tensile stiffness modulus above about 100,000 p.s.i. and a moisture vapor transmission rate below about 10 gm. mils/24 hours atm. 100 in.$^2$ are employed when it is desired to employ a second coating of these polymers over the inner coating when the poly(p-xylylene) coating is less than about 10 percent by weight of the pellets.

As with the inner coating, it is desirable that the outer coating be uniform and continuous over the entire pellet but be as thin as possible and still provide the required physical properties of toughness and moisture and solvent protection. Total coating on the pellet with the poly(p-xylylenes) are desirably above 0.5 mil, although it can be considerably above this if such need is required, or can be below this when care in coating and in the handling of the finished coated pellets is exercised.

It should not be inferred in referring to the inner and outer coating that two specific and different poly-p-xylylenes always need to be employed. While this is the situation with many of these materials, other suitable polymers may possess properties which make them suitable for use as both the inner and outer coating even in very thin coatings. This is the situation with poly-dichloro-p-xylylene which has a tensile stiffness modulus of 400,000 and a moisture vapor transmission rate of 5 gm. mils/24 hours atm. 100 in.$^2$. Its sigma para sum of the substituent chloro groups is 0.454 and thus is suitable for both coatings.

However, such other polymers as the poly(cyano-p-xylylene) which is highly preferred as the inner coating but which has a moisture vapor transmission rate of 30 gm. mils/24 hours atm. 100 in.$^2$ and a tensile stiffness modulus of 400,000 p.s.i. is not suitable as the outer coating except in thick coatings. Poly(ethyl-p-xylylene), which does provide the strength and moisture transmission rate and is thus suitable for use as the outer coating, has a negative sigma para value and is totally unusuable as the inner coating.

It is another aspect of this invention to employ as the outer coating, a suitable polymer having high fuel value such as for example, polyethylene, vinyl halide resins plastisols, epoxide resins, polysulfide resins, and like material having a high hydrogen concentration to the amount of carbon present as is hereinafter discussed. With this alternate type of coating, heavier coatings of polymer-fuel binder can be applied and the actual formulation of the propellant mixture be applied as the outer coating.

It is not critical in this invention that the nitronium perchlorate be in any particular form, although it is generally available in pellet or granular form. Smooth surfaced pellets, spheres, or like geometric forms are most easily coated with a minimum of the poly-p-xylylene and are hence preferred although irregular granules can be employed if desired. In such instances, it may be necessary to employ heavier coatings of polymer to completely fill all cracks and voids in the granules and to provide for sufficient reinforcement of weak edges to prevent the mechanical fracture during subsequent handling.

It is an unusual facet of the polymers employed herein that they immediately polymerize on condensation of reactive diradicals having a structure

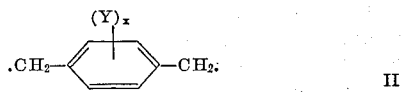
II

The reactive diradicals are quite stable in the vapor phase at temperatures above about 200° C. but on contact with any surface cooler than their ceiling condensation temperature, will immediately condense and polymerize into an essentially linear polymer free of cross-linking.

Poly(p-xylylenes) have been known heretofore, being first disclosed by M. Szwarc in British Patent 650,947, in which the polymer was prepared by the high temperature (900°–1000° C.) pyrolytic dehydrogenation of para-xylene and subsequent condensation of the reactive diradicals on a cold surface. These polymers are essentially cross-linked, however, and are intractable insoluble materials. Cross-linking arises because of ring dehydrogenation caused by the extremely high temperatures needed for pyrolysis. Similarly, the yield of reactive diradicals by this technique is far from quantitative, yielding only about 10–15% of p-xylene diradicals and other by-products including toluene, di-p-tolylethane, dimethyl stibene, dimethyl anthracenes and related by-products. About 85–90% of nonpyrolyzed p-xylene passes through the system unchanged.

Such a technique would be totally unsuitable for use in the present invention, where the p-xylene and other liquid products condensing on the nitronium perchlorate would immediately react with explosive force. Similarly, by this technique, it is not possible to put substituent groups on the polymer as they are cleaved off the p-xylene nuclei by the high temperature required for pyrolysis. Hence, it could not be possible to coat the pellets initially with the electron withdrawing substituted poly-p-xylylene.

However, by the technique as hereinafter described, it is now possible to not only secure such substituted poly-(p-xylylenes) but that in the preparation of the reactive diradicals, quantitative yields of the diradicals are secured and the condensate polymer is free of any organic by-products which could react with the nitronium perchlorate.

This is accomplished by pyrolyzing the substituted cyclic dimer represented by the structure

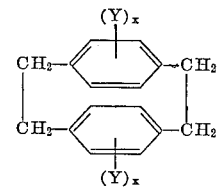

where Y and $x$ have the values hereinabove recited, at elevated temperatures which cleaves quantitatively into two reactive diradicals which can be the same or different, to provide a vaporous system which is free of other organic materials and contains only the reactive diradical.

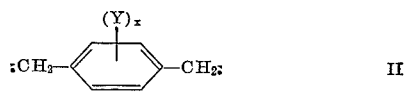
II

Thus there are no other organic moieties in the system with which the nitronium perchlorate can react. This provides the only suitable technique for coating such a material.

As stated before the cyclic di-p-xylylene can be readily substituted in the aromatic nuclei by many conventional techniques as halogenation, alkylation, acetylation, cyanation, nitration, etc.

Such workers as D. J. Cram et al., J. Am. Chem. Soc., 81, p. 5977 (1959), 80, pp. 3094 and 3126 (1958), 77, pp. 1174, 1186, and 6289 (1955) have prepared a substantial number of such material, others of which are covered by pending applications Ser. Nos. 50,601 and 50,603, filed Aug. 19, 1960, respectively entitled "Alkylated Di-p-Xylylenes," now U.S. Pat. 3,117,168, and "Halogenated Di-p-Xylylenes," now abandoned, by one of us and in applications filed contemporaneously herewith entitled "Cyanated Di-p-Xylylenes," Ser. No. 176,803, now U.S. Pat. 3,155,712, and "Iodo-Di-p-Xylylenes," Ser. No. 176,795, now abandoned, all of which are herewith incorporated by reference.

With these precursors it is now possible to provide a vaporous condensation system which is free of other organic materials. Pyrolytic cleavage occurs at temperatures exceeding about 450° C. and most advantageously at temperatures between about 550° C. and 700° C. to form the reactive diradical.

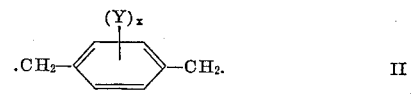
II

Regardless of the pressure employed, pyrolysis of the starting cyclic di-p-xylylene begins at about 450° C. and does not appear to be a function of the operating pressure. At temperatures above about 700° C., cleavage of the substituent group can occur, resulting in a tri- or polyfunctional species causing cross-linking or highly branched polymers.

While pyrolysis temperature is essentially independent of the operating pressure, it is however preferred that reduced or subatmospheric pressures be employed. For most operations, pressures within the range of 0.0001 to 10 mm. Hg are most practical. However, if desired, greater pressures can be employed, and, if desirable, inert non-organic vaporous diluents such as nitrogen, argon, carbon dioxide, and the like can be employed to vary the optimum temperature of operation or to vary the partial pressure in the system.

The diradicals formed in the manner described above are made to impinge upon the surface of the nitronium perchlorate pellets which are maintained at a temperature substantially below 200° C. and below the ceiling condensation temperature of the vaporous diradicals present, thereby condensing thereon and thus spontaneously polymerizing the diradicals to form a uniform coating of a linear homopolymer having the general structure

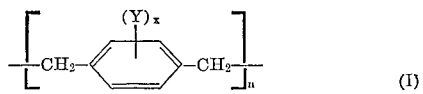

(I)

wherein Y represents the same aromatic nuclear substituents and values as defined in structure (I) and heretofore recited, $x$ being an integer from 1 to 3, inclusive, and $n$ is a number from 10 to 10,000 or higher. Thus, it is seen that the condensation-polymerization operation does not affect the aromatic portion of the diradical (II), nor does it affect the substituent groups.

In this technique, it has also been found possible to control the molecular weight of the homopolymers by control over the particular condensation conditions. It has been discovered for instance that within relatively narrow ranges of temperature changes in the condensation temperature (i.e. 10–20° C.) some distinct control over the molecular weight of the polymers can be secured, provided that all such temperatures are below the condensation temperature of the p-xylylene species.

In order to insure uniformity of coating of particulate material, the material must be maintained in such a random motion as to continually expose fresh surfaces to the condensing diradicals.

The particular material that can be coated by the present invention can be in the form of pellets, small grains, granular particles, and the like. The only restriction is that the material be able to be maintained in constant motion without losing its particulate nature such as by crumbling or breaking. Thus grain strength and density of the particles should be as high as possible so as to prevent fracture of the particles on coating and subsequent handling. Grain or particle size is not critical in this invention for any size grain conveniently handled can be so coated. However, it is desirable in composite rocket fuel formulations that a range or variety of grain or particle sizes be employed so that as dense a fuel-oxidizer mass as possible be obtained. Sizes ranging in average particle size between about 1/32 inch to as large as 1/2 inch or more are quite conveniently handled, with the larger size being preferred as less poly-p-xylylene is required for adequate encapsulation. However, such larger size pellets unless extremely dense, can be more susceptible to mechanical fracture on handling.

In the attached drawings there is shown suitable apparatus for carrying out the poly-p-xylylene coating of the nitronium perchlorate grains or pellets in which FIG. 1 is a diagrammatic representation of the general organization of the apparatus in cross section.

Figure 2:
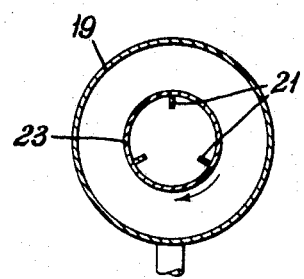

FIG. 2 is a cross section of the coating chamber taken along line 2—2 in FIG. 1.

The apparatus adapted for the performance of the above-mentioned process is shown in these drawings.

Referring now to FIG. 1, said apparatus comprises a pyrolysis chamber 11 having two temperature zones $a$ and $b$. The zone $b$ is provided with heating means 13 sufficient to sublime or vaporize the di-p-xylylene disposed within that end of the pyrolysis chamber 11 and capable of maintaining a temperature of 150–200° C. The second zone $a$, communicating with the first zone $b$, is provided with heating means 15 sufficient to pyrolyze the vapors produced in said first zone $b$.

In a preferred embodiment, the pyrolysis tube 11 is composed of Vycor or quartz tubing. The heating means 15 is a combustion furnace capable of maintaining temperature of at least 450° C. to about 700° C. A coating chamber 23 is equipped with baffles 21 and which is adapted to have particulate material disposed therein is penetrated by the nozzled posterior portion 17, of the aforementioned pyrolysis chamber 11. Rotatable means such as motor 25 and connecting shaft 29 impart a rotary motion to the coating chamber 23. Said motor and shaft being adapted to support and also impart to said coating chamber 23 a movement whereby the said particulate material in said coating chamber 23 undergoes a tumbling motion. Other types of tumbling means could also be used to impart motion to the coating chamber 23. It is important, however, to keep the particles in random motion so as to continually expose fresh surfaces for coating.

The agitating means of the present invention is not restricted to a motor and connecting shaft; any electromechanical device capable of imparting rotational or translational motion or a combination thereof can be incorporated into said agitating means with the provision that a continuous tumbling motion as hereinbefore mentioned be imparted to the particulate material disposed within the said coating chamber 23. For instance, a magnetic coupling device can be used whereby a rotating magnetic field set up by the agitating means is transferred to the coating chamber thus imparting a rotary motion to said coating chamber 23. A vacuum-supporting wall 19 surrounds said coating chamber 23 and the nozzled posterior portion 17 of the pyrolysis chamber 11. Vacuum seals (not shown) are advantageously employed at the points of entry of the connecting shaft 29 and the nozzled posterior portion 17 of the pyrolysis chamber 11 into the wall 19. Said vacuum supporting wall 19 is preferably detachably connected to permit said wall 19 to be opened into two sections so as to permit entry and exit of coating chamber 23. An aperture 27 is said wall 19 leads to a vacuum pump (not shown) or suitable vacuum unit.

Referring now to FIG. 2, the cross sectional view 2—2 of the coating chamber 23 of FIG. 1, shows in detail the baffles 21 provided within said coating chamber 23 whereby the tumbling motion of the particulate material disposed within said coating chamber 23 is enhanced.

The specific embodiment of the present invention represented in FIG. 2 shows a plurality of baffles, however, a greater or lesser number of baffles can satisfactorily be employed provided that the particulate material disposed within the coating chamber 23 is continuously agitated and said agitation is augmented by the said baffles 21.

The quantity of material handled by the present apparatus is limited only by the size of the coating chamber 23.

In order to insure uniformity of coating, the coating chamber 23 is advantageously rotated at from about 10–500 r.p.m. thus continuously tumbling the particles and exposing fresh surfaces to the condensing diradicals.

Premature condensation and polymerization of the diradicals on surfaces other than those presented in the coating chamber is prevented by maintaining all surfaces in contact with the diradicals except those within the coating chamber at temperatures above about 150° C.–200° C. and above the condensation temperature of the particular reactive diradical involved.

Other obvious modifications can be made to this apparatus as desired. For example, means for continuously or batch-wise feeding of the di-p-xylylene to the vaporization section of tube 11 can be employed using vacuum traps or positive displacement feed units sealed to vacuum. Likewise, continuous feed of particulate material to be coated in chamber 23 can be provided without departing from the scope and intent of the present invention.

In accordance with the preferred mode for carrying out the present invention, a measured quantity of the appropriate di-p-xylylene is placed within the vaporization zone of the pyrolysis chamber. The system is evacuated to the aforementioned pressure level and the di-p-xylylene is then passed through the pyrolysis zone. The pyrolysis zone should be long enough to provide for a residence time of .001 to 1 second, or at least sufficient to pyrolyze all the di-p-xylylene to the reactive diradical. The diradicals formed in the pyrolysis zone are passed through the nozzled portion of the pyrolysis chamber into the coating chamber which is under vacuum and maintained in a rotary motion. The diradicals contact the particulate nitronium perchlorate while said material is being continuously tumbled within the coating chamber and condense on the surfaces of said material thus forming a polymeric film of the poly-p-xylylene. After the desired thickness of coating has been maintained, the unit can be turned off and the coated particle recovered from the coating chamber.

The thickness of the polymeric coating applied is basically determined by the time the nitronium perchlorate pellets are exposed to the vaporous p-xylylene diradicals and is also generally a function of the design of the equipment and its coating capacity. Certain materials may be coated with only a very thin coating of 0.1 mil or less of the poly-p-xylene where only resistance to solvent or reactive attack is desired. With other materials which may be subjected to greater mechanical abuse during subsequent handling and use, it may be desired to coat the grains or particles quite heavily with one mil or more of polymer, in which case the particular poly-p-xylylene serves both as inner and outer coatings.

If desired, the thus coated grains or particles of nitronium perchlorate can be employed directly in casting of rocket fuel formulations by use of liquid or solid polymer fuel-binders by conventional means now employed in preparing composite rocket fuel formulations. The ideal characteristics for a polymer fuel-binder to bind the particles into a dense mass of oxidizer and fuel is that it have a maximum hydrogen content and a minimum carbon content, and one that preferably has available oxygen, has a high density, i.e. between 1 and 2 if possible, and is initially a liqiud of low vapor pressure but which cures to a solid strong tough coating by use of catalyst and/or mild heating. Also, it is desirable that the polymer have a brittle temperature lower than the lowest anticipated temperature to which the coated pellets are exposed, a high resistance to plastic flow and low elongation. High temperature stability is also quite important as is long shelf life and resistance to mechanical abuse. Liquid resins and solvent solutions of solid resins are most preferred for the outer coating.

It is also permissible that the liquid resin or solvent solution have incorporated therein such high energy additives as aluminum, lithium, beryllium and such other high energy metals as may be desired, or metal hydrides such as lithium aluminum hydrides, lithium hydrides, boron hydrides, beryllium hydrides, or even solvated aluminum hydrides and other hydrides providing high specific energy. Similarly, there can also be present such materials as aid and assist the burning of the polymer binder, as for example metal chromate or chromite salts and like additives.

In the aspect of this invention where it is desired that the outer coating be the organic fuel-binder employed as the other main ingredient in rocket fuel formulation, the one thin coating of the substituted poly-p-xylylene on the pellets makes it possible to employ a number of suitable techniques to encapsulate the pellets or granules with an outer coating of organic polymer fuel.

While techniques employing mild heat are permissible, it is preferred that the temperature to which the p-xylylene coated pellets or granules are subjected be not in excess of about 50° C. except for short periods of time. In the poly-p-xylylene coating hereinabove discussed, no problems are created even though the temperatures of the vaporous diradicals is about 150° C. when they contact the nitronium perchlorate since the actual pellets in the coating chamber are seldom above about 50°. However, prolonged exposure of the nitronium perchlorate pellets at temperatures exceeding about 70° C. would lead to uncontrollable reaction of the nitronium perchlorate, with explosive force, and are therefore undesirable.

However, such relatively mild temperature coating techniques as dissolving the fuel polymer in a suitable solvent therefor, in sufficiently high a solids content that one-step coating techniques followed by mild heating to remove the solvent, can apply the polymer with or without added fuel components and exotic additives in required amounts such that the ultimate coated pellet comprises basically the entire rocket propellant formulation. For example, polyethylene, dissolved in heptane to a solids content of about 20% into which the pellets are quickly dipped or which is sprayed onto the pellets in a suitably adapted spray drier, cyclone separator or other free fall apparatus or by fluidized bed coating technique, preferably with both the polymer solution and the drying atmosphere being at slightly elevated temperatures to assure quick coating and evaporation of solvent.

Equally adaptable are polyvinyl halide solutions, organosols and plastisols, liquid phenolic or epoxy resins with or without solvent, but preferably with a hardener therefore, the polyesters, polyurethanes and polycarbonate resins, the polysulfide, polybutadiene, and other equivalent synthetic rubbers dissolved in a suitable solvent therefore.

This solvent technique, particularly in fluidized bed or spray drier technique is useful on the poly-p-xylylene coated nitronium perchlorate pellets and granules because of the unusually high resistance to solvent possessed by the poly-p-xylylenes. They are completely unaffected by such solvents as alcohols, ethers, simple aromatic liquid, ketones, epoxides and amines. They exhibit solubility in such solvents as benzylbenzoate, α chloro napthalene, chlorinated biphenyls and α bromo naphthalene, only at temperatures above about 200° C. Hence, these latter solvents can also be employed if desired by keeping the temperatures low. Low temperature boiling solvents are most convenient for use and most easily removed.

However, where solvent coating techniques are inconvenient, the use of any low vapor pressure liquid which solidifies by cooling, as with paraffin waxes and other greases, or by heating such as liquid epoxy, phenolic or polyester resins with or without hardeners therefore can be similarly used. Thus, any of the polymers employed as the polymer fuel-binder can be employed as the outer coating of the nitronium perchlorate coated pellets of this invention.

The following examples are illustrative of this invention. Unless otherwise indicated, all parts and percentages are by weight.

EXAMPLE I

Nitronium perchlorate in this example was encapsulated with poly(dichloro-p-xylylene) having the repeating unit

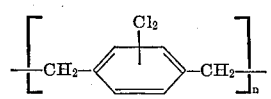

which was prepared by pyrolyzing tetrachloro-di-p-xylylene having the formula

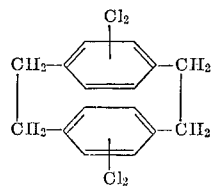

which was prepared as follows.

In a 500 ml., three-neck flask equipped with stirrer, addition funnel, and reflux condenser was placed 5.0 grams di-p-xylylene, 150 ml. of carbon tetrachloride and a pinch of iron powder. The flask was immersed in a water bath at 10° C. and a solution of 6.8 g. of chlorine in 150 ml. of carbon tetrachloride added to the stirred mixture over a period of one hour. The solution was stirred for an additional hour, heated to reflux to drive off the by-product hydrogen chloride, and filtered to remove the iron. The solvent was removed by atmospheric distillation and the product purified by vacuum distillation. A total of 7.1 g. of tetrachloro-di-p-xylylene (85% yield) B.P. 180–190° C. at 0.2 mm., M.P. 130–140° C. was obtained. The material contained 40.7% chlorine by elemental analysis compared with the theoretical value of 41% chlorine for tetrachloro-di-p-xylylene.

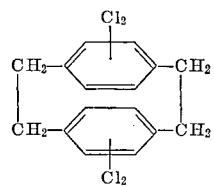

One-half gram of nitronium perchlorate, ($NO_2ClO_4$) pellets, ⅛ inch in diameter and variable lengths ranging from about 1/16 inch to ½ inch and averaging about 40 pellets per gram, were transferred from its original container to a small bottle serving as a coating vessel in a dry box (of dehumidified air) and the bottle containing the pellets was immediately transferred to a coating chamber and the encapsulating system evacuated to a pressure of between 0.01 to 0.3 mm. Hg pressure absolute.

The coating chamber consisted of a two-piece glass chamber, overall dimensions of 3 inches in diameter and 12 inches long having a ground-glass joint at about the middle to allow the chamber to be opened. Through one end of the chamber is connected a glass inlet tube for feeding in the pyrolysis vapors of the substituted di-p-xylylene. The substituted di-p-xylylene is vaporized in a glass chamber immediately preceding the pyrolysis zone. The vaporization chamber is maintained at a temperature of about 150–200° C. and connected to a quartz pyrolysis zone heated with an electric heating furnace to temperatures of 500°–700° C. for pyrolysis of the vapors.

Two outlets are provided in the coacting chamber, one for attachment to the vacuum system, the other through a vacuum seal providing a stirrer bearing. A metal stirring shaft, ground to fit the stirrer bearing is inserted through the bearing and connected to motor means outside the coating chamber for rotating the stirrer at about 50–100 r.p.m. A bottle clamp or holder is attached to the end of the shaft inside the coating chamber for holding the bottle containing the pellets but providing for free tumbling of the pellets inside the bottle on the rotation of the shaft. The bottle clamp holds the bottle on its side during the coating and the inlet tube for feeding in the pyrolysis vapors enters into the mouth of the bottle holding the pellets to be coated when the unit is assembled.

After the unit is assembled and steady vacuum of 0.01 to 0.3 mm. Hg maintained, the motor was started and the bottle rotated at about 75 r.p.m. while feeding in dichloro-p-xylylene diradical vapors over a ten-minute period. The coating chamber was initially maintained at room temperature but the temperature gradually rose to about 40° C. at the end, due to feeding in the hot vaporous diradicals.

The dichloro-p-xylylene diradicals were prepared by pyrolysis of 2.0 grams of tetrachloro-di-p-xylylene, by vaporizing the tetrachloro-di-p-xylylene in the first heated chamber and passing the vapors through the pyrolysis chamber maintained at about 650° C. The residence time in the pyrolysis zone of the vaporized tetrachloro-di-p-xylylene was about .01 second which was sufficient to convert all of the tetrachloro-di-p-xylylene to the reactive dichloro-p-xylylene diradicals. The vaporous diradicals at a temperature of about 150° C. were fed directly into the coating chamber and onto the nitronium perchlorate pellets through the glass tube. The vaporous diradicals instantly condensed and polymerized on the surface of the nitronium perchlorate pellets and their rotation and tumbling in the bottle provided a coating of the poly (dichloro-p-xylylene) over the entire surface about 0.6 mil thick.

The system was then brought back to atmospheric pressure and 3.0 grams of dichloro-di-p-xylylene was placed in the distillation and vaporization zone. The system was then re-evacuated to about 0.01 mm. Hg absolute and the poly(dichloro-p-xylylene) coated pellets coated again with a top coating of poly(chloro-p-xylylene) in the same manner as above, in 10 minutes contact with the pyrolysis vapors of the dichloro-di-p-xylylene. The total thickness of the two coats amounts to about 2 mils. The finished coated pellets could be exposed indefinitely to atmospheric conditions without effect.

Testing of the coating

In each of twenty-three test tubes filled with 10 ml. water and 0.5 ml. of a universal pH indicator solution, there was added two of the nitronium perchlorate pellets coated as above with the poly(dichloro-p-xylylene) and poly(chloro-p-xylylene). The initial pH of the solution was in the range of 5.5–6.0 as indicated by the color of the indicator solution in the tubes. After seventeen days in the solution twenty-one of the tubes had a pH in the range of 3.5–4.5 indicating that the hydrogen ion concentration had increased from about $10^{-5.5}$ to about $10^{-4}$. As a control, when the pellets of several tubes were deliberately crushed, the pH immediately decreased to a pH of about 2 or less indicating a hydrogen ion concentration of $10^{-2}$. This experiment established that in the 17 days immersion in water, only 1 per cent of the nitronium perchlorate had been hydrolyzed.

EXAMPLE II

Employing exactly the same procedure as Example I, a first coating of poly(cyano-p-xylylene) was applied by the use of 2 grams of dicyano-di-p-xylylene placed in the distillation zone and the initial coating conducted over a ten minute period by condensing and polymerizing the cyano-p-xylylene diradicals on the surface of the nitronium perchlorate pellets. The first coating was evenly distributed over the entire surface of the pellet and was about 0.8 mil thick.

The dicyano-di-p-xylylene was prepared from the dibromo-di-p-xylylene as follows.

A mixture consisting of 5 grams of di-p-xylylene, 0.1 gram of iron powder and 400 ml. of carbon tetrachloride was placed in a 500 ml. 3 neck flask, equipped with a reflux condenser, stirrer and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for twelve hours. The catalyst was filtered off and the solution concentrated to 30 ml. by distillation. Upon cooling, dibromo-di-p-xylylene crystallized from solution. The material was separated by filtration, and purified by sublimation. A total of 3.3 grams equivalent to 37% yield was obtained. The material had a melting point of 240° C.–242° C. The material analyzed for 43.5% bromine, as compared with the theoretical value of 43.7% for dibromo-di-p-xylylene, having the structure

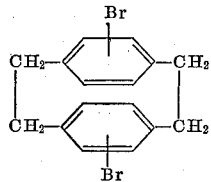

Into a dry 100 ml. three-necked flask fitted with a reflux condenser protected from moisture with a drying tube, a thermometer, and a dry nitrogen-gas inlet was placed 7.32 g. of dibromo di-p-xylylene, 4.5 g. of dry cuprous cyanide and 20 ml. of dry quinoline. The mixture was heated at 210° C. to 230° C. for 20 hours with continuous stirring. After the reaction period. The mixture was cooled to about 100° C. and poured into a mixture of 100 ml. each of benzene and a 29% aqueous solution of ammonium hydroxide. The concentration was half that of the commercially available aqueous ammonium hydroxide (58%). The mixture was shaken well until all the course particles disintegrated. The benzene layer was separated, washed with dilute aqueous ammonium hydroxide, water, and then filtered. After concentrating the benzene solution to dryness, the crude solid residue was distilled under vacuum to give a slightly colored crystalline product. The color is due to traces of quinoline.

The distilled product was recrystallized from 95% ethanol to give an analytically pure product having a melting point of 165° C. to 167° C. and in a yield of 81%. Elemental analysis confirmed the structure.

Calculated for $C_{18}H_{14}N_2$ (percent): C, 83.72; H, 5.43; N, 10.85. Found (percent): C, 83.45; H, 5.70; N, 10.5.

No bromine was detected.

The second coating was carried out with chloro-p-xylylene diradicals produced by pyrolysis of 3.0 grams of di-chloro-di-p-xylylene over a ten minute period. The finished coated pellets could be exposed indefinitely to atmospheric conditions without effects. The dichloro-di-p-xylylene was prepared in the same manner as the dibromo-di-p-xylylene recited above.

Testing of the coating

Testing of the pellets encapsulated first with poly(cyano-p-xylylene) and next with poly(chloro-p-xylylene) was conducted in the same manner as in Example I using sixteen test tubes, each with 2 coated pellets. The initial pH was also 5.5–6.0. None of the pellets failed, for after 14 days all of the 16 test tubes had a pH of 4.0–4.5. When the pellets were crushed purposely, the pH decreased to between 1.0 and 1.5, indicating that over 99 percent of the nitronium perchlorate remained unhydrolyzed.

EXAMPLE III

Five grams of nitronium perchlorate, as ⅛" diameter pellets and averaging about 40 pellets per gram were transferred in an atmosphere of pure nitrogen in a dry box into a six ounce polyethylene bottle having a crease indented into the bottle along one side to provide for better tumbling of the pellets during rotation in the coating chamber. The bottle and pellets were placed in the coating apparatus described in Example I, with the nozzle of the pyrolysis tube inserted into the open neck of the bottle and the bottle securely clamped in the bottle clamp. The unit was closed as quickly as possible to minimize contact with air, and the vacuum system started and the pressure in the coating chamber quickly dropped to 60μ Hg. Pressures were read on a continuously indicating thermocouple vacuum gauge, reading in microns where 1 micron equals 0.001 mm. Hg.

After a period of forty-five minutes, the pressure then being 31.5μ Hg, the sublimer furnace was turned on to vaporize the 2.0 grams of tetrachloro-di-p-xylylene previously placed therein. This was maintained by the heating mantle at 200° C. and the quartz pyrolysis tube was set at 650° C. The section of the lead-in tube carrying the pyrolysis vapors to the coating chamber was wrapped with heating tape and the temperature maintained at 150° C. or above to prevent condensation and polymerization of the diradicals on this section of the tube. The coating chamber was maintained initially at about room temperature but gradually rose during the coating operation to about 40° C.

A period of seven and one-half minutes was needed to complete the sublimation and pyrolysis of the tetrachloro-di-p-xylylene under these conditions. During this time, the pressure gradually rose to 60μ Hg after five and one half minutes and then slowly receded to 45μ. After this the sublimation heater, pyrolysis furnace and heating tapes were turned off and the unit allowed to cool for twenty minutes before breaking the vacuum with nitrogen.

An additional two grams of tetrachloro-di-p-xylylene was charged into the sublimation zone and the unit immediately reclosed and the vacuum restarted. Only five minutes were required to avacuate the once-coated nitronium perchlorate pellets to 25μ Hg pressure. The sublimer and pyrolysis furnaces were again started and the heating tape on the pyrolysis vapor tube turned on. The two grams of tetrachloro-di-p-xylylene again required seven and one-half minutes for sublimation and pyrolysis under the same conditions as the first coating. This time the pressure first dropped after two minutes to 20μ Hg then rose after another five minutes to 25μ Hg and then dropped finally to about 23μ. The unit was turned off and allowed to cool and the vacuum line broken with nitrogen.

The twice coated pellet, both coatings being of poly(dichloro-p-xylylene), were evenly coated, light tan in color and could be safely handled in the atmosphere, even with moist hands. The coating was about 1 mil thick.

However, to give the pellets a tough, abrasion resistant and completely moisture resistant coating of poly(chloro-p-xylylene) they were transferred to a new polyethylene bottle, two grams of dichloro-di-p-xylylene were charged into the sublimation tube, the bottle containing the pellets clamped in the unit and the coating chamber closed up. The vacuum was then turned on and the pressure dropped rapidly to 18μ Hg. The sublimation unit was held at 180° C. and the pyrolysis tube at 650° C. with no heating tape about the entrance tube.

Seven minutes were required to pyrolyze the dichloro-di-p-xylylene and deposit the poly(chloro-p-xylylene) on the coated pellets. The pressure in the coating chamber first dropped to 16μ Hg and then gradually rose to 25μ Hg after about 5 minutes and then finally dropped to 14μ, after which the unit was turned off and allowed to cool. The pellets were removed from the coating chamber and examined. The poly(chloro-p-xylylene) top coating was hard, tough and firmly adherent to the undercoating. Total coating thickness was about 2 mils.

Testing of the coating

Eight of the so coated pellets of nitronium perchlorate were each immersed in 10 ml. water containing the universal pH indicator in individual test tubes. After three weeks (21 days) immersion, the pH of the test solution had decreased only from the 5.5–6.0 range to the 4.0–4.5 range, indicating that less than 0.1% of the available nitronium perchlorate was hydrolyzed. None of the pellets failed and no swelling of the pellets or of the coating was observed.

The thus coated particulate material, with one or two coats of the substituted poly(p-xylylene) are thus usable in applying an overcoat of a solid organic polymer fuel-binder without fear of chemical interaction and can be safely handled even in humid atmospheres without unusual precautions. It is a desirable embodiment of this invention that a top coat of fuel-binder be given to the pellets so as to substantially increase their mechanical strengths for subsequent handling with safety under all conditions.

What is claimed is:

1. Solid particulate nitronium perchlorate having as an inner coating contacting the surface of the particles, a continuous coating surrounding and encapsulating said particle of a solvent-resistant, moisture-impermeable linear polymer having the repeating unit

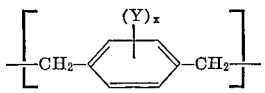

wherein Y is an electron withdrawing substituent group having a positive sigma para value of at least 0.20, $x$ is an integer from 1 to 3, inclusive, and the sum of the sigma para value of all of the substituent Y groups is at least 0.40.

2. Solid particulate nitronium perchlorate as defined in claim 1 wherein the weight of the coating on the particles is from about 1 to 20 percent by weight of the nitronium perchlorate particles.

3. Solid particulate nitronium perchlorate as defined in claim 1 wherein Y is chlorine and $x$ is at least 2.

4. Solid particulate nitronium perchlorate as defined in claim 1 wherein Y is a cyano group.

5. Solid particulate nitronium perchlorate having an inner coating contacting the surface of the particles, a continuous coating surrounding and encapsulating said particle of a solvent-resistant, moisture-impermeable polymer having the repeating unit

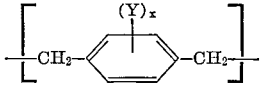

wherein Y is an electron withdrawing substituent group having a positive sigma para value of at least 0.20, $x$ is an integer from 1 to 3, inclusive, and the sum of all of the substituent Y groups is at least 0.40, and as an outer coating thereon, a tough, moisture-impermeable polymeric coating making the said particles more resistant to fracturing on mechanical abuse.

6. Solid particulate nitronium perchlorate as defined in claim 5 wherein the outer coating is of a polymer having a tensile stiffness modulus above about 100,000 p.s.i. and a moisture vapor transmission rate below about 10 gram mils/24 hours atm. 100 in.²

7. Solid particulate nitronium perchlorate as defined in claim 6 wherein the outer coating is a poly(p-xylylene).

8. Solid particulate nitronium perchlorate as defined in claim 6 wherein Y is chlorine, $x$ is at least 2 and the outer coating is a poly(p-xylylene).

9. Solid particulate nitronium perchlorate as defined in claim 6 wherein Y is a cyano group and the outer coating is a different poly(p-xylylene).

10. Solid particulate nitronium perchlorate as defined in claim 6 wherein the outer coating is a thermoplastic polymer.

11. Composite solid rocket propellant formulation comprising a coated solid particulate nitronium perchlorate having as an inner coating contacting the surface of the particles, a continuous coating surrounding and encapsulating said particle of a solvent-resistant moisture-impermeable polymer having the repeating unit

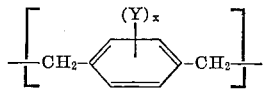

wherein Y is an electron withdrawing substituent group having a positive sigma para value of at least 0.20, $x$ is an integer from 1 to 3, inclusive, and the sum of all of the substituent Y groups is at least 0.40, and the thus coated particulate nitronium perchlorate completely encased in a polymer binder for the said particles, and serving as the principal fuel for the propellant formulation.

12. Composite solid rocket propellant formulation as defined in claim 11 wherein Y is chlorine and $x$ is at least 2.

13. Composite solid rocket propellant formulation as defined in claim 11 wherein Y is a cyano group.

14. Composite solid rocket propellant formulation as defined in claim 11 wherein the polymer binder is a polyurethane.

15. Composite solid rocket propellant formulation as defined in claim 11 wherein the polymer binder is a polybutadiene.

16. Composite solid rocket propellant formulation as defined in claim 11 wherein the polymer binder is a polyepoxide resin.

References Cited

UNITED STATES PATENTS 3,388,015   6/1968   Spenadel et al. _____ 149—19

BENJAMIN R. PADGETT, Primary Examiner

U.S. Cl. X.R.

149—19